US006483878B1

(12) United States Patent
Yonezawa et al.

(10) Patent No.: US 6,483,878 B1
(45) Date of Patent: Nov. 19, 2002

(54) VIDEO COMMUNICATION SYSTEM, VIDEO COMMUNICATION PROCESSING METHOD AND STORAGE MEDIUM THEREOF

(75) Inventors: Hiroki Yonezawa, Yokohama (JP); Koichiro Tanaka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/357,975

(22) Filed: Jul. 21, 1999

(30) Foreign Application Priority Data

Jul. 24, 1998 (JP) .......................................... 10-209353

(51) Int. Cl.⁷ .............................. H04N 7/12; H04N 7/14; G09G 5/00
(52) U.S. Cl. ............................... 375/240.25; 348/14.12; 345/327
(58) Field of Search .......................... 375/240.02, 240.1, 375/240.14, 240.25; 348/423.1, 397.1, 385.1, 388.1, 14.01, 14.02, 14.08, 14.09, 14.12, 14.13; 725/67–68, 62, 109–110, 148, 151; 370/464–465, 460, 498, 905, 912, 916; 345/1.1, 1.2, 1.3, 2.1–2.3, 327–332

(56) References Cited

U.S. PATENT DOCUMENTS

| | | | | |
|---|---|---|---|---|
| 4,620,289 A | * | 10/1986 | Chauvel | 345/559 |
| 5,128,776 A | * | 7/1992 | Scorse et al. | 358/426 |
| 5,229,850 A | * | 7/1993 | Toyoshima | 348/153 |
| 5,272,527 A | * | 12/1993 | Watanabe | 348/143 |
| 5,450,549 A | * | 9/1995 | Casparian | 345/556 |
| 5,657,246 A | * | 8/1997 | Hogan et al. | 348/515 |
| 5,761,603 A | * | 6/1998 | Nojima et al. | 455/3.1 |
| 6,041,286 A | * | 3/2000 | White | 702/176 |
| 6,085,019 A | * | 7/2000 | Ito et al. | 386/52 |
| 6,091,857 A | * | 7/2000 | Shaw et al. | 382/251 |
| 6,181,711 B1 | * | 1/2001 | Zhang et al. | 370/468 |
| 6,208,376 B1 | | 3/2001 | Tanaka et al. | 348/153 |
| 6,246,695 B1 | * | 6/2001 | Seazholtz et al. | 370/468 |
| 6,266,082 B1 | * | 7/2001 | Yonezawa et al. | 348/159 |
| 6,271,805 B1 | | 8/2001 | Yonezawa | 345/1 |
| 2001/0001608 A1 | * | 5/2001 | Parruck et al. | 370/232 |

OTHER PUBLICATIONS

Chao et al., "A packet video/audio system using the asynchronous transfer mode technique", IEEE Trans. on Consumer Electronics, vol. 35, Issue 2, pp. 97–105, May 1989.*

* cited by examiner

Primary Examiner—Vu Le
(74) Attorney, Agent, or Firm—Fitzpatrick, Cella, Harper & Scinto

(57) ABSTRACT

The present invention provides such a video communication system as plural information transmitters for transmitting video information are connected to information display units for displaying the video information received from the information transmitters through communication means, comprises a reception means for asynchronously receiving the video information from the information transmitters, a process means for asynchronously processing the video information received by the reception means and a display means for asynchronously displaying the plural video information processed by the process means, so that the present invention solves such a problem as influencing an entire display condition of video information received from plural information transmitters because of different speed of a part of networks or defective condition of a part of networks.

24 Claims, 12 Drawing Sheets

SHAPE OF MOUSE CURSOR
IN DRAG AND DROP

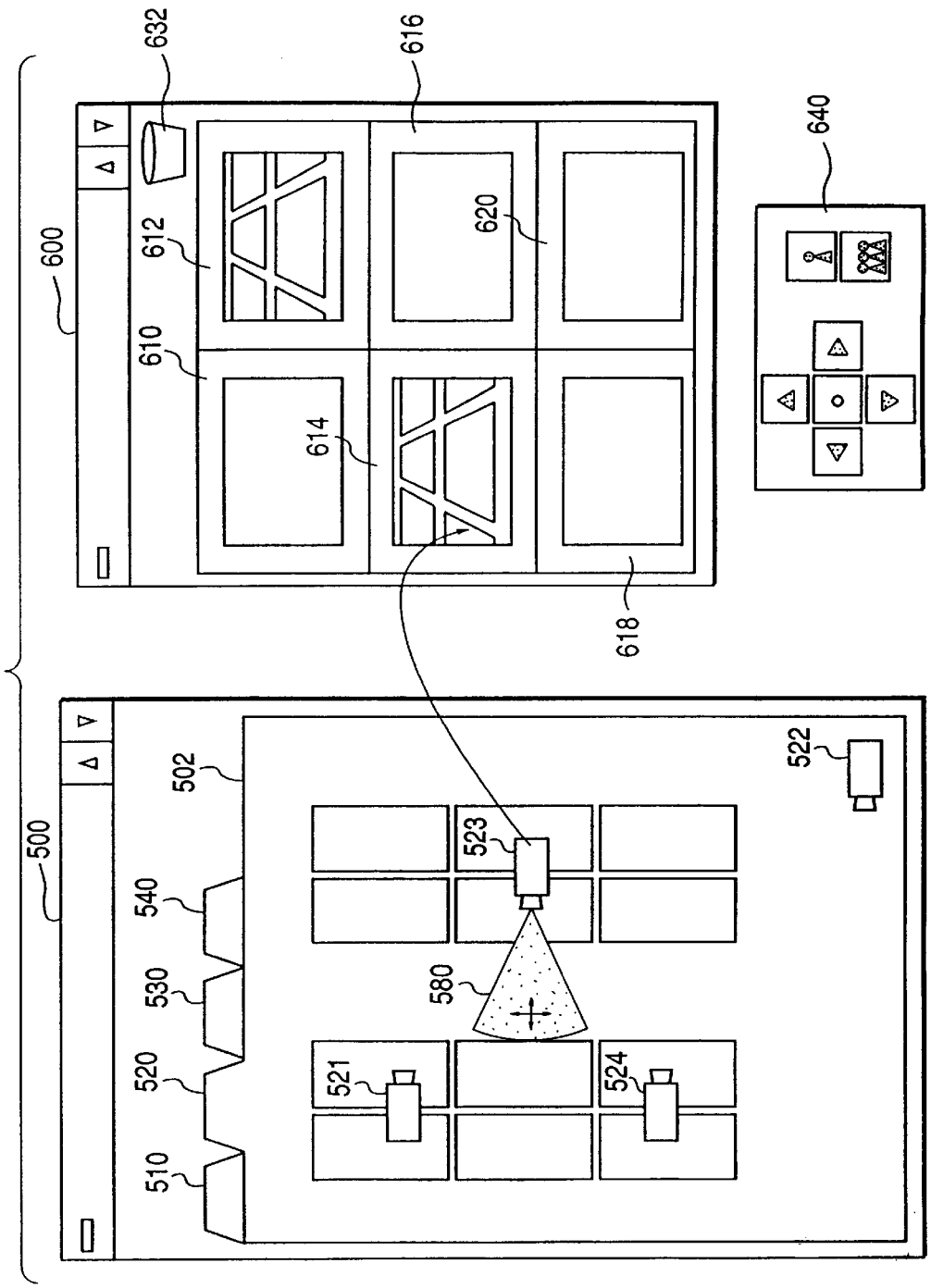

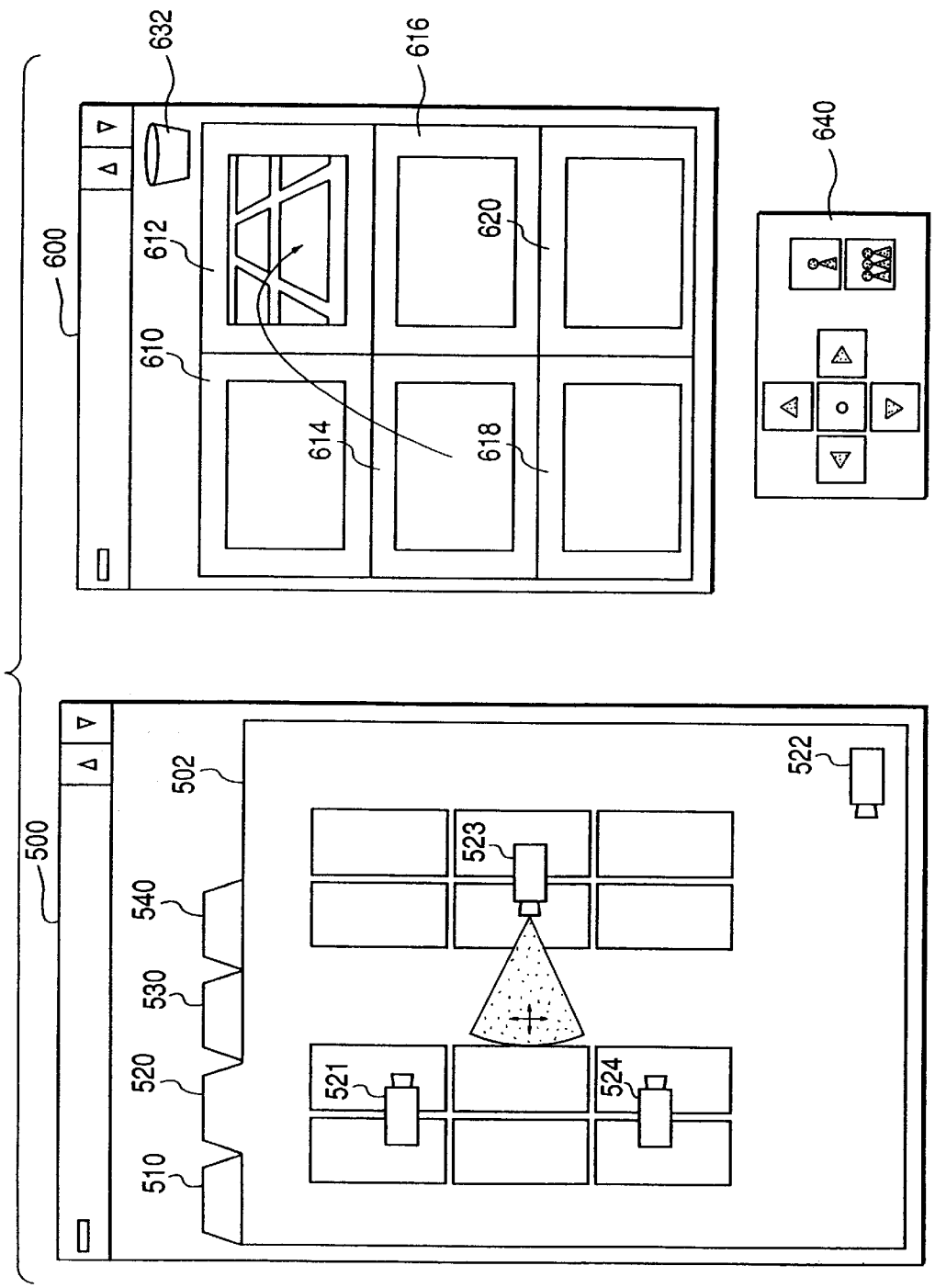

DETAILED FLOW 2 OF CONNECTION PROC

VIDEO RECEPTION SOFTWARE (CONNECTION THREAD)

DETAILED FLOW 1 OF DISPLAY PROC

VIDEO RECEPTION SOFTWARE (MAIN THREAD)

DETAILED FLOW 2 OF DISPLAY PROC
VIDEO RECEPTION SOFTWARE (VIDEO THREAD)

VIDEO COMMUNICATION SYSTEM, VIDEO COMMUNICATION PROCESSING METHOD AND STORAGE MEDIUM THEREOF

BACKGROUND OF THE INVENTION

1. Field of the Invention

The present invention relates to a video communication system and a video communication processing method for displaying images by receiving image data or the like from, for example, a remote-located communication apparatus connected through a communication network.

2. Related Background Art

For example, such a video transmission system as realizing to have a chat utilizing information of audio and video or transmitting video information between desired plural points by forming a network to connect plural video cameras and computers, which are disposed within a building, through a communication line has been proposed.

In this video transmission system, a user of a computer at a certain point can remotely control a video camera at a desired point and display video information photographed by the video camera on a screen of own computer.

In the video transmission system which enables to realize a remote control of the video camera, as increasing the number of video cameras to be controlled, the user is more required to easily grasp a position where each of the video cameras is located. Therefore, such technique as superimposing and displaying a camera symbol, which indicates a located position of each video camera, on an image used in displaying a map has been proposed. Further, such technique as representing an actual direction of the video camera by displaying a direction of the camera symbol has been proposed.

In this system, video information of the plural video cameras can be displayed almost at the same time by a computer. However, in a momentary time, a control of the video camera, a video information transmission and a video information display can be performed for only a certain computer. Accordingly, it is required to contrive a method for obtaining such an image as it looks like a dynamic image by executing a video transmission process and a video display process in time divisional.

In the above-described system, it is possible to increase the number of images, which can be displayed almost at the same time, until a certain level. However, in a conventional proposed method, in a case where a video transmission computer, which displays plural images at the same time, is connected to a video display computer through a network of slow data transmission (small data communication capacity per unit time) and a network of quick data transmission (large data communication capacity per unit time), there occurs such a problem as displaying speed is standardized under the network of slow data transmission.

In a case where an abnormal state is appeared in the video transmission computer or the network, there occurs such a problem as interrupting all renewal of video for a constant time.

SUMMARY OF THE INVENTION

An object of the present invention is to provide a video communication system and a video communication method without deteriorating performance entirely in a case where a video display unit is connected to plural video transmitters through networks of different communication speed or a defect is appeared in each of the networks.

To achieve the above-described object, the present invention is characterized in the following structure.

That is, a video communication system in which plural information transmitters for transmitting video information are connected to an information display unit for displaying the video information received from the information transmitters through communication means comprising:

a reception means for asynchronously receiving the video information from the information transmitters;

a process means for asynchronously processing the video information received by the reception means; and a display means for asynchronously displaying the plural video information processed by the process means.

The video information, which is compressed, corresponds to such data as an image of one frame is diffused in plural packets. The process means is such a process as combining the data diffused in the packets to the image of one frame.

Another object of the present invention is to provide a video communication apparatus and a video communication method having new functions and a storage medium thereof.

Other objects of the present invention will become apparent from the following embodiment and the attached drawings.

BRIEF DESCRIPTION OF THE DRAWINGS

FIG. 6 is a view showing a state in displaying video information by drag and drop as the embodiment of the present invention;

FIG. 8 is a view showing a state in changing a display area by the drag and drop as the embodiment of the present invention;

DETAILED DESCRIPTION OF PREFERRED EMBODIMENT

The embodiment of a video communication system according to the present invention will be described in detail with reference to the attached drawings.

Figure 1:
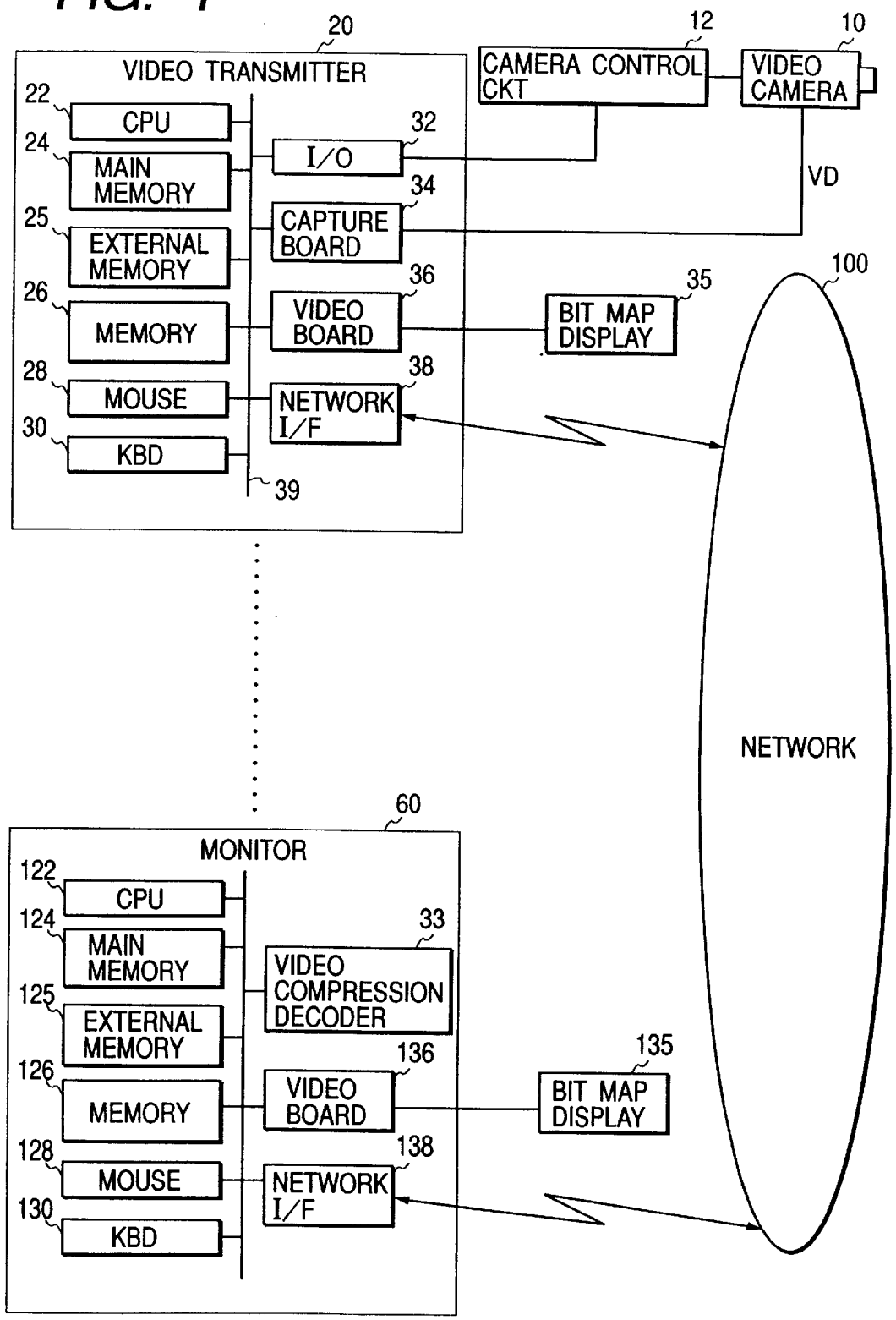
FIG. 1 is a block diagram showing an entire schematic structure of a communication system including a video communication system as the embodiment of the present invention.

FIG. 1 is a block diagram showing an entire schematic structure of a communication system including the video communication system as the embodiment of the present invention.

In FIG. 1, reference numeral 10 denotes a video camera acts as a device for generating a video signal on the basis of a photographed image. Reference numeral 20 denotes a video transmitter such as a work station (WS) for transmitting an image signal from the video camera 10 to a monitor 60 and receiving a control signal for controlling the video camera 10 from the monitor 60, a personal computer or the like. Reference numeral 60 denotes the monitor such as a work station for receiving an image signal from the video transmitter 20 and transmitting the control signal for controlling the video camera 10 to the video transmitter 20, the personal computer or the like. It should be noted that the plural video transmitters 20 and the plural monitors 60 are connected with each other through a network 100.

The plural video transmitters 20 and the monitors 60 can communicate each other through the network 100. Preferably, the video transmitter 20 performs an analog-to-digital (A/D) conversion to the image signal from the video camera 10. Then, obtained digital image data is compressed to transmit it to the monitor 60 through the network 100.

Reference numeral 12 denotes a camera control circuit for controlling an operation of the video camera 10 such as panning, tilting, zooming, focusing, stopping or the like in accordance with a control signal (control code) from the video transmitter 20. The control signal is inputted to the camera control circuit 12 from an input/output interface 32 in the video transmitter 20 on the basis of a standard such as RS232C, USB (Universal Serial Bus), IEEE (Institute of Electrical and Electronics Engineers) 1394 or the like.

In a case where the video camera 10 does not perform such an operation as panning, tilting or the like, the camera control circuit 12 is not always required. However, it may be preferable to be realized to perform a control of power ON/OFF of the video camera 10.

<Video Transmitter 20>

The structure of the video transmitter 20 will be described. Reference numeral 24 denotes a main memory and numeral 26 denotes a memory such as a hard disk or the like. Reference numeral 28 denotes a mouse as a pointing device. However, the pointing device is not limited to the mouse but may be another device, for example, such as a touch panel on a display 35, or the like. Reference numeral 30 denotes a keyboard as an input means. Reference numeral 25 denotes an external memory, from which a storage medium such as a floppy disk, a CD-ROM, an MO or the like can be removed. Reference numeral 32 denotes the input/output (I/O) interface, which connects the camera control circuit 12 so as to transmit and receive the control signal of the video camera 10. Reference numeral 34 denotes a video capture board for capturing a video output signal VD from the video camera 10. The video output signal may be an analog signal such as a general NTSC or a digital signal. However, in case of the analog signal, it is required to have a function of performing the A/D conversion. Reference numeral 36 denotes a video board for obtaining video information, which is captured by the capture board 34, through a bus 39 to display the video information on an optional position in the bit map display 35. Reference numeral 38 denotes a network interface for communicating with the monitor 60 through the network 100. Each of these devices is mutually connected with each other through the system bus 39. A CPU 22 controls an entire of the video transmitter 20 and a display in the bit map display 35 in accordance with software stored in the storage medium or the memory 26, or software obtained through the network 100.

In a case where the video capture board 34 does not have a data compressing function, software for realizing the function is provided and a data compressing process may be executed by the CPU 22.

Image data photographed by the video camera 10 is transmitted to the remotely located monitor 60 through the network 100 by the video transmitter 20 which has the above-described structure. The video camera 10 is controlled in accordance with control codes received from the monitor 60.

<Monitor 60>

Subsequently, the structure of the monitor 60 will be described. In the structure of the monitor 60, the description of the same devices as those in the video transmitter 20 will be omitted. However, in respect of a network interface 138, it receives the compressed image data from the video transmitter 20. Then, a CPU 122 displays an image photographed by the video camera 10 or state of the video camera 10 on a bit map display 135 by demodulating the received data (encoded data) using a video compression decoder 33 and controlling a video board 136 on the basis of the demodulated image data. Further, the CPU 122 transmits a control code for controlling the video camera 10 to the video transmitter 20 in accordance with data inputted by an user at the monitor 60 using a keyboard 130 or a mouse 128.

Software of the video transmitter 20 and the monitor 60 in the embodiment will be described. Needless to say, the software to be described in the following is executed by hardware of the video transmitter 20 or the monitor 60 which has been described with reference to FIG. 1.

Figure 2:
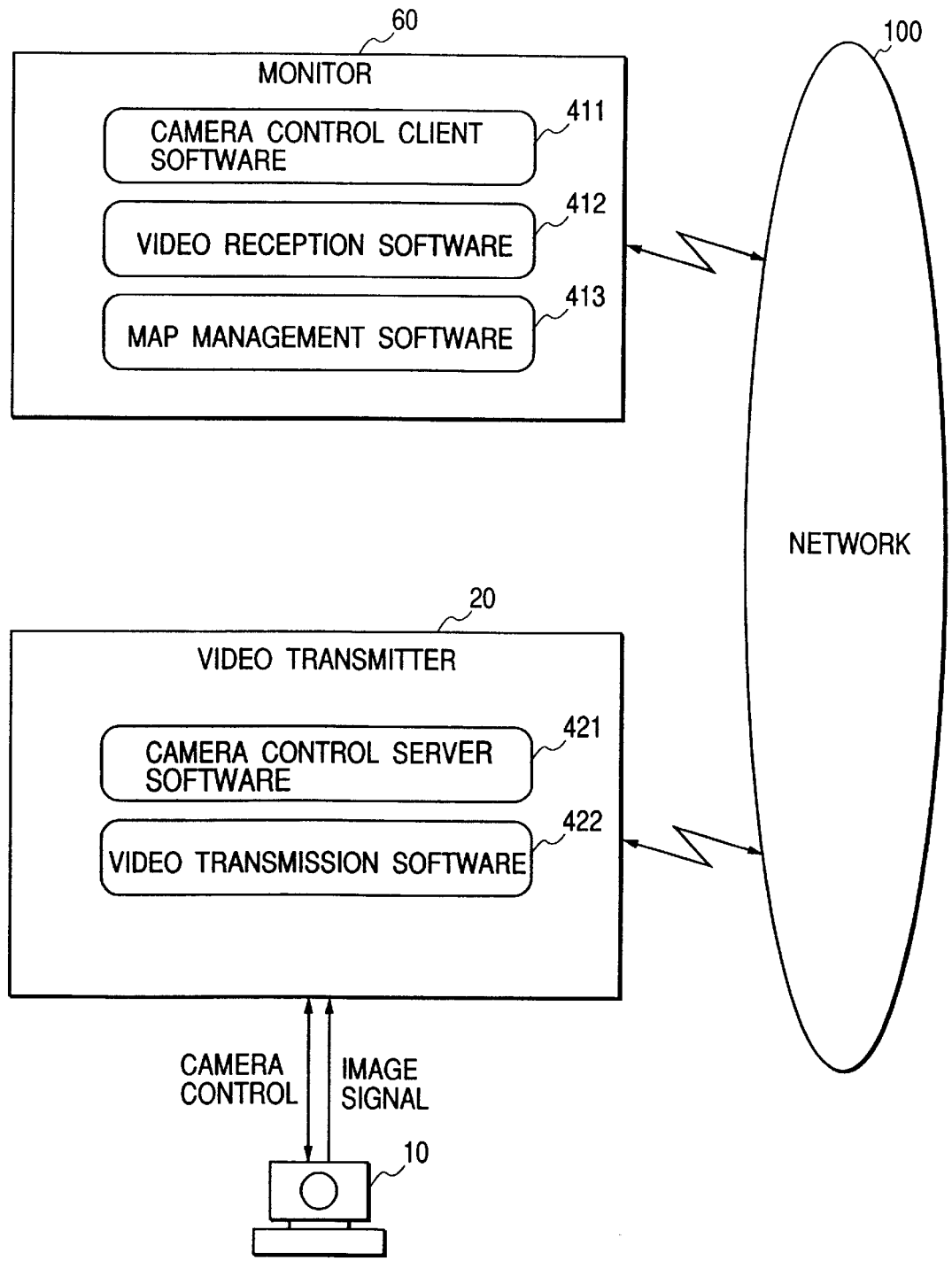
FIG. 2 is a view for explaining structure of main software of a video transmitter 20 and a monitor 60 as the embodiment of the present invention.

FIG. 2 is a view for explaining structure of main software of the video transmitter 20 and the monitor 60 as the embodiment of the present invention.

Initially, software executed in the monitor 60 will be described. Reference numeral 411 denotes camera control client software for remotely controlling the video camera 10 connected to the video transmitter 20. Reference numeral 412 denotes video reception software for demodulating the compressed image data transmitted from the video transmitter 20 as a form of packet and displaying an image. The video reception software 412 is such software as managing image data received from all of the video transmitters 20 (video cameras 10) connected to the network 100. This software 412 has such a function as holding a camera ID of each camera, a host computer ID of the video transmitter 20, to which the camera is connected, an operating condition of the camera such as panning/tilting, zooming or the like, information of the camera of "whether or not the camera can be controlled ?" and information indicating the present state of "what camera is controlled now ?" or "what camera's video is displayed now ?" into the monitor 60. Also, the camera control client software 411 and map management software 413 commonly hold these information, which are utilized in changing a display of a camera symbol or the like. Reference numeral 413 denotes the map management software which has a GUI (graphical user interface) function for graphically displaying a position, panning and zooming conditions of the camera 10 using a map, the camera symbol and a scope display shown in FIG. 6 to be described later and controls an operation of the video camera 10. For the monitor 60, these software are previously installed in the memory 126.

Subsequently, software executed in the video transmitter 20 will be described. Reference numeral 421 denotes camera control server software which controls an operating condition such as panning/tilting, zooming, white balance or the like of the video camera 10 connected to the video transmitter 20 and captures image data outputted from the video camera in the video transmitter 20. Reference numeral 422 denotes video transmission software which transmits video information to the monitor 60, which is now controlling the video camera 10, synchronously operating with the camera control server software. For the video transmitter 20, these software are previously installed in the memory 126.

Needless to say, other than the above-described software, such software as controlling an interactive communication through the network 100, the memories 26 and 126, external memories 25 and 125 or the like is also held.

<User Interface>

A user interface in the embodiment, that is, a screen to be displayed on the bit map display 135 will be described. At first, the description will be given on condition that one set of the monitor 60 is connected to the video transmitter 20 through the network.

Figure 3:
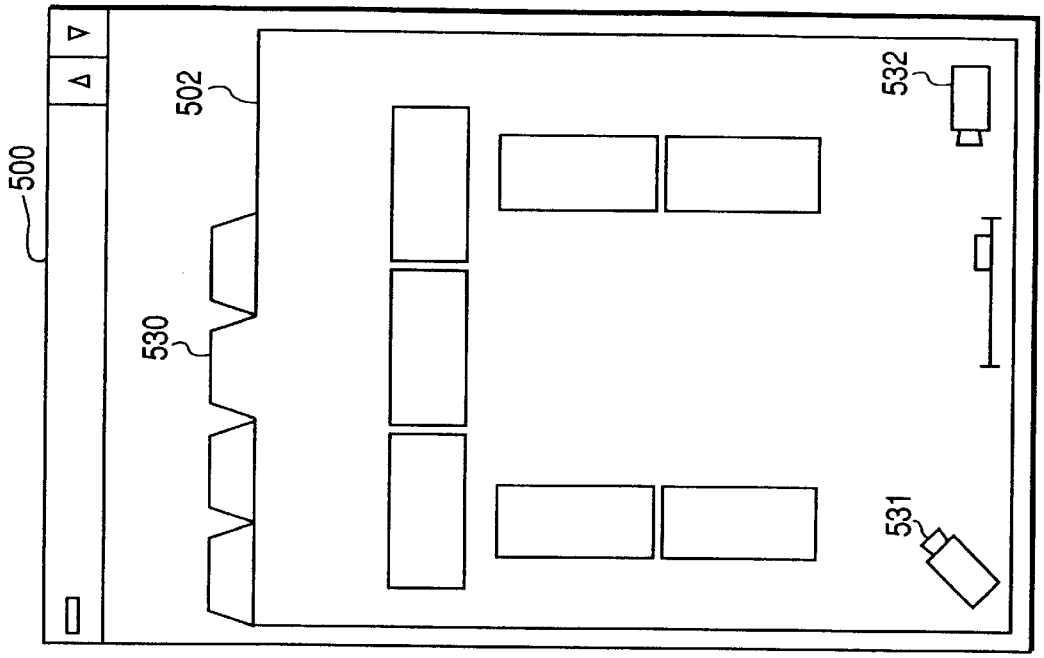
FIG. 3 is a view showing a display example of the monitor as the embodiment of the present invention.
Figure 4:
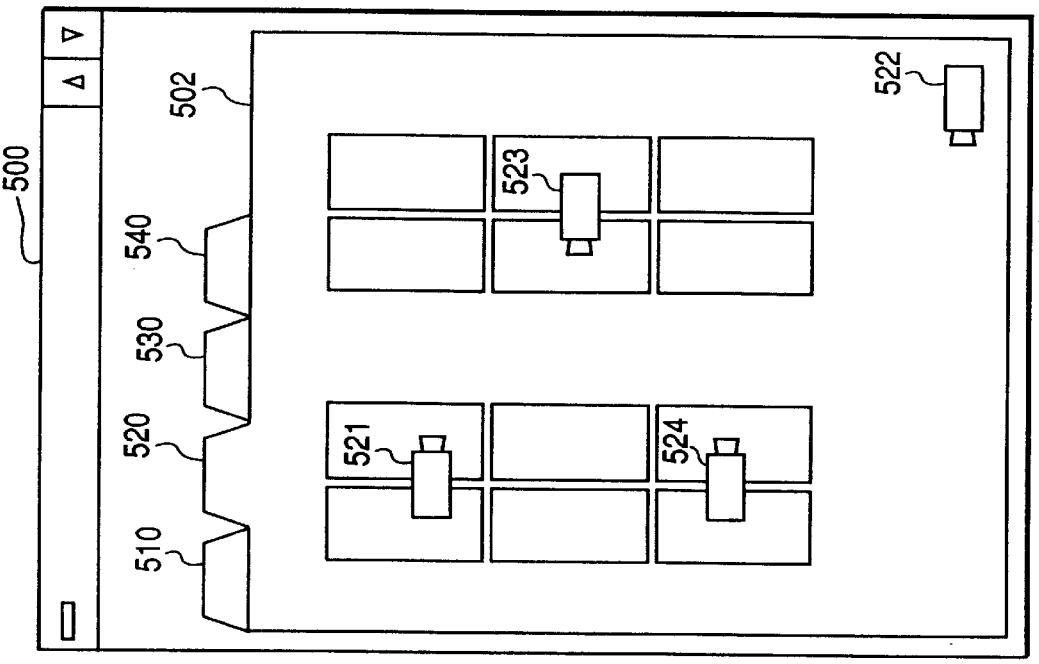
FIG. 4 is a view showing a display example of the monitor as the embodiment of the present invention.

FIGS. 3 and 4 are views showing display samples of the monitor 60 as the embodiment of the present invention. FIGS. 3 and 4 respectively show an example of the screen to be displayed on the bit map display 135 of the monitor 60. In FIG. 3, reference numeral 500 denotes a map window, where maps are displayed. In the embodiment, plural maps 520, 530, 540 and the like indicating layouts of an office, a shop, a warehouse and the like are managed. A tag is attached to each of the maps. The map attached by the tag is displayed in the front screen (map display area 502) by clicking this tag using the mouse 128. In this case, the camera symbol is also displayed on the map.

In FIG. 3, a state of displaying the map 520 on the map display area 502 out of the maps 510, 520, 530 and 540 is indicated. In this state, camera symbols 521, 522, 523 and 524 are displayed as icons arranged on the map 520. At this time, if the tag of the map 530 is clicked, a sample shown in FIG. 4 is displayed.

As shown in FIG. 4, the map 530 is displayed on the map display area 502 and the camera symbols 531 and 532 are displayed on the map 530.

Figure 5:
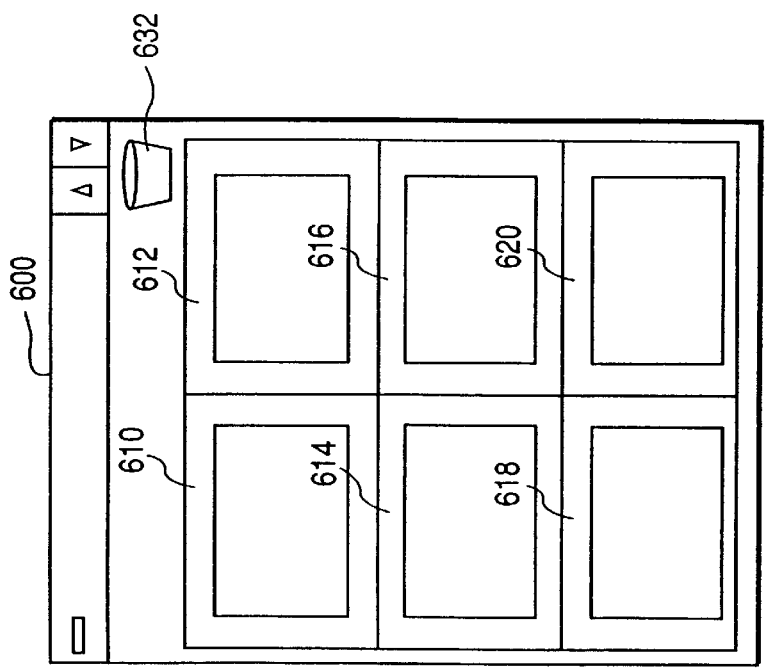
FIG. 5 is a view showing a display example of a window for displaying video information from a video camera as the embodiment of the present invention.

FIG. 5 is a view showing a display example of a window for displaying video information from the video camera as the embodiment of the present invention. In a window 600 for displaying images from the video cameras 10, images photographed by the plural video cameras 10 are displayed on plural video display areas 610, 612, 614, 616, 618 and 620 as shown in FIG. 5. Reference numeral 632 denotes a trash box icon used in deleting the displayed image from the video display area. Reference numeral 640 denotes a panel used in controlling the video cameras has various keys of controlling the video cameras 10 to enable to control the panning/tilting and zooming of the selected camera.

In the embodiment, six areas are shown as an example. However, the embodiment is not limited to this, and video information may be displayed on the same screen as that in the window shown in FIG. 3 or 4.

The GUI according to a video communication system of the embodiment will be described with reference to FIGS. 6, 7, 8, 9 and 10. In the embodiment, when the camera icon on the map 520, 530 or 540 is dragged and dropped on an optional video display area in the video display window, a dynamic image from the video camera, which corresponds to the dragged and dropped icon, is displayed on the video display area, where the icon is dropped.

Figure 7:
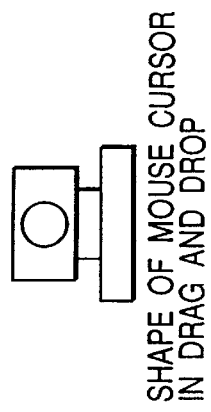
FIG. 7 is a view showing a mouse cursor of the video camera in operating of the drag and drop as the embodiment of the present invention.
Figure 9:
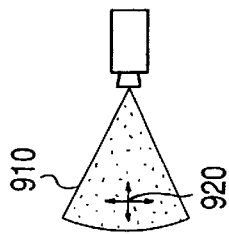
FIG. 9 is a view showing a camera icon which indicates a state in displaying photographed video information as the embodiment of the present invention.
Figure 10:
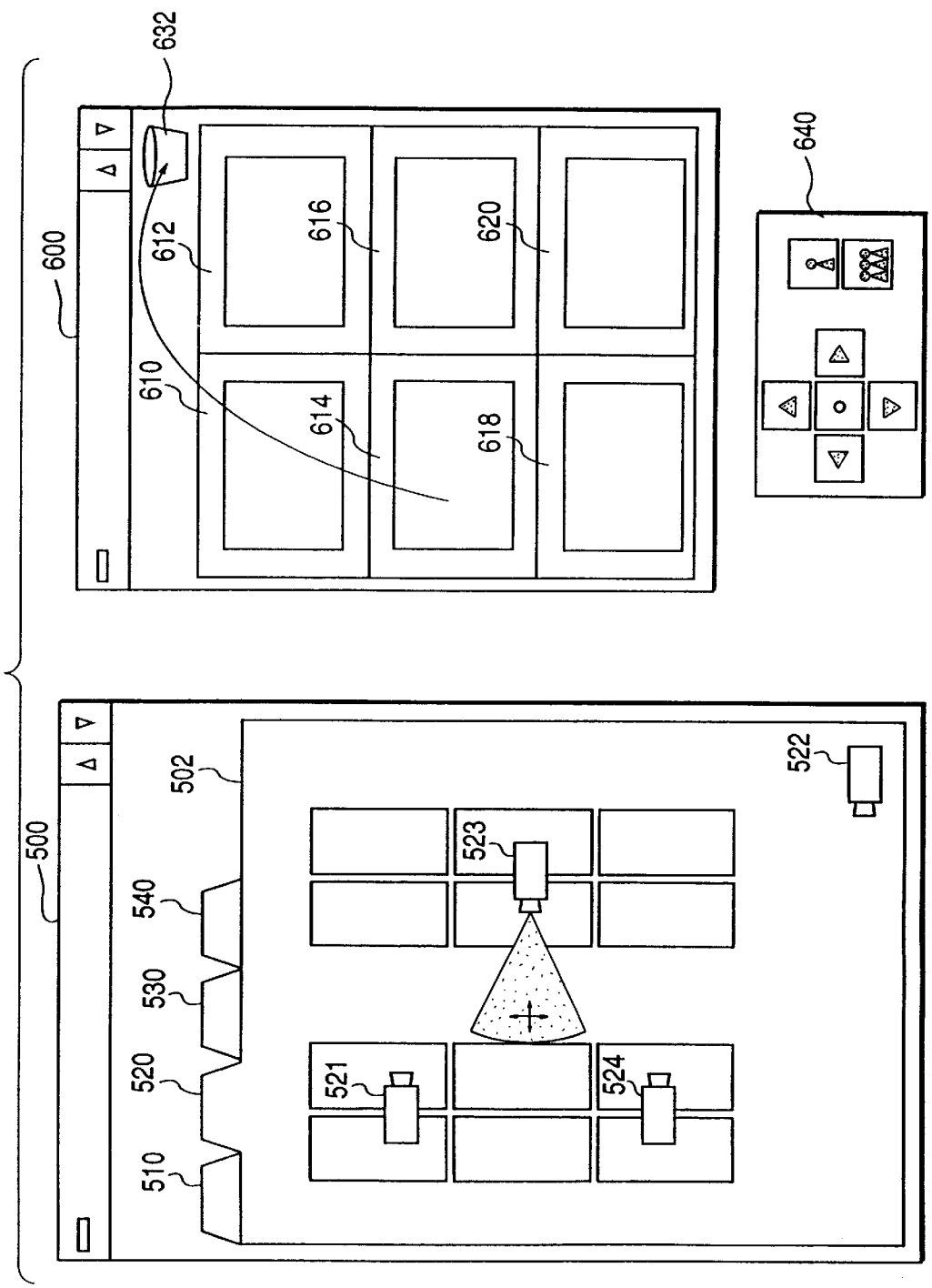
FIG. 10 is a view showing a control state of canceling a display by the drag and drop as the embodiment of the present invention.

FIG. 6 is a view showing a state in displaying video information by drag and drop (D&D) as the embodiment of the present invention. That is, a state of dragging and dropping the camera icon 523 on the video display area 614 is indicated. FIG. 7 is a view showing a mouse cursor of the video camera in operating of the D&D as the embodiment of the present invention. FIG. 8 is a view showing a state in changing a display area by the D&D as the embodiment of the present invention. FIG. 9 is a view showing a camera icon which indicates a state in displaying photographed video information as the embodiment of the present invention. FIG. 10 is a view showing a control state of canceling a display by the D&D as the embodiment of the present invention.

In the embodiment, in operating of the D&D, since a form of the mouse cursor becomes such a camera form as shown in FIG. 7, an user can confirm a state of operating the D&D. At this time, an ID number of the camera is searched from information of a camera position, where the map management software 413 is dragged, so as to inform the ID number of the dragged and dropped camera to the video reception software 412. Such information as the panning/tilting of the camera, a name of the camera or a name of the host computer, to which the camera is connected, is searched from the video reception software 412 so as to connect with the video transmission software 422. This process will be described later.

The video reception software 412 also notifies these information to the camera control client software 411 and the map management software 413.

The camera control client software 411 performs to connect with the camera control server software 421 of the video transmitter 20, which is connected to the video camera 10, through the network 100 by a communicating method in accordance with the notified information. Thereafter, between the camera control client software 411 of the monitor 60 and the camera control server software 421 of the video transmitter 20, an operation control of the video camera 10 connected to the video transmitter 20 is performed. However, such information as the panning/tilting of the camera or the like is notified to the video reception software 412 from the camera control client software 411 every predetermined time.

The map management software 413 changes the direction of the camera icon so as to correspond to an actual direction of the video camera 10 by renewing the map stored in the video board 136, draws a scope 910 indicating a state of displaying an image photographed by the video camera 10, or draws a control pointer 920, which is used in controlling the panning/tilting and zooming of the camera, within an area of the scope 910.

Such information as the panning/tilting of the camera or the like is notified to the map management software 413 from the video reception software 412 every predetermined time. When the condition of panning/tilting, zooming or the like of the camera is changed by the camera control panel 640, this change is reflected in a display condition of the camera icons 521, 522, 523 and 524 (on the map 520), 531, 532, 533 and 534 (on the map 530) or the like.

The video reception software 412 executes a connection process with the video transmission software 422 by the following procedure.

Figure 11:
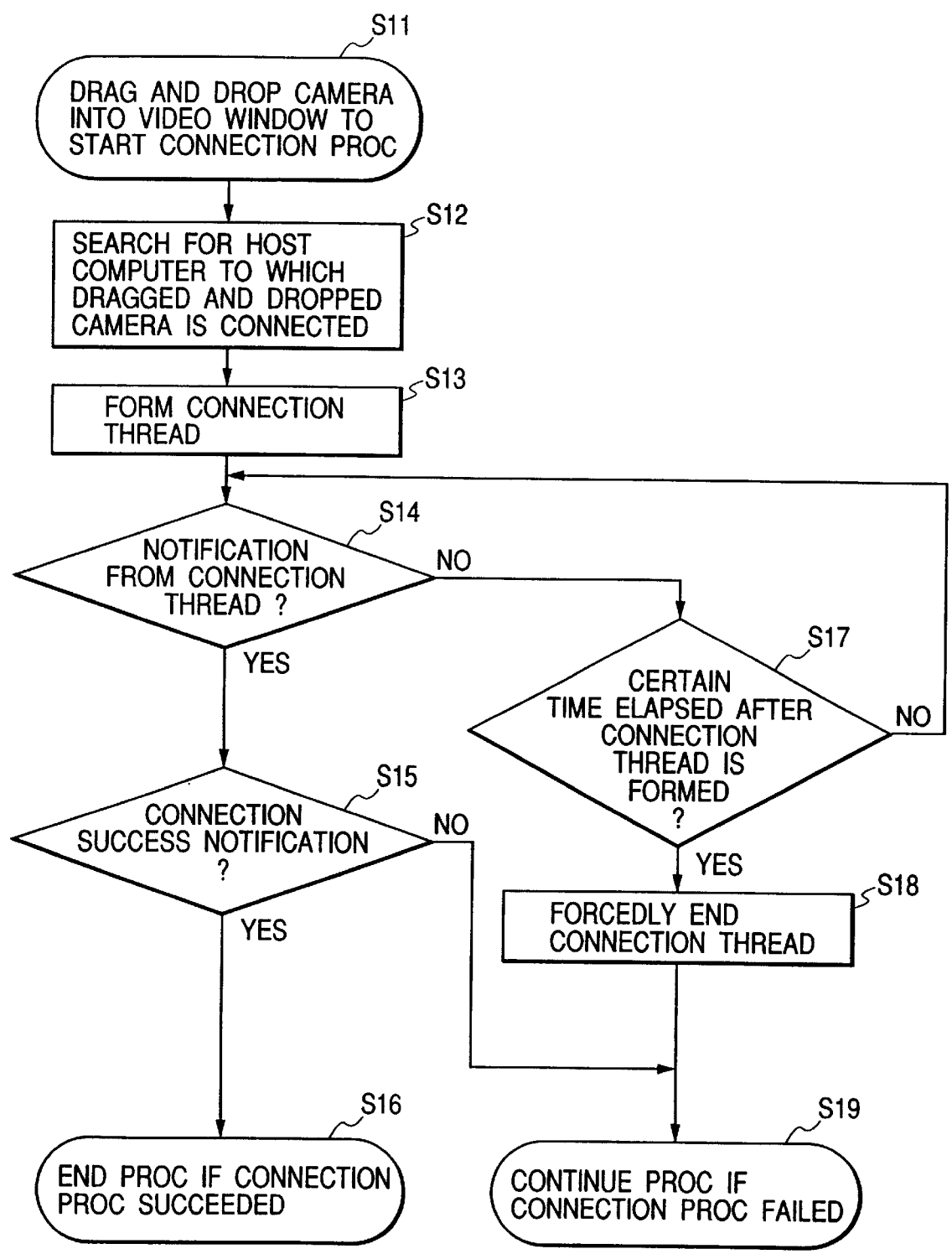
FIG. 11 is a flow chart showing a connecting process of video reception software (main thread) in a certain monitor as the embodiment of the present invention.
Figure 12:
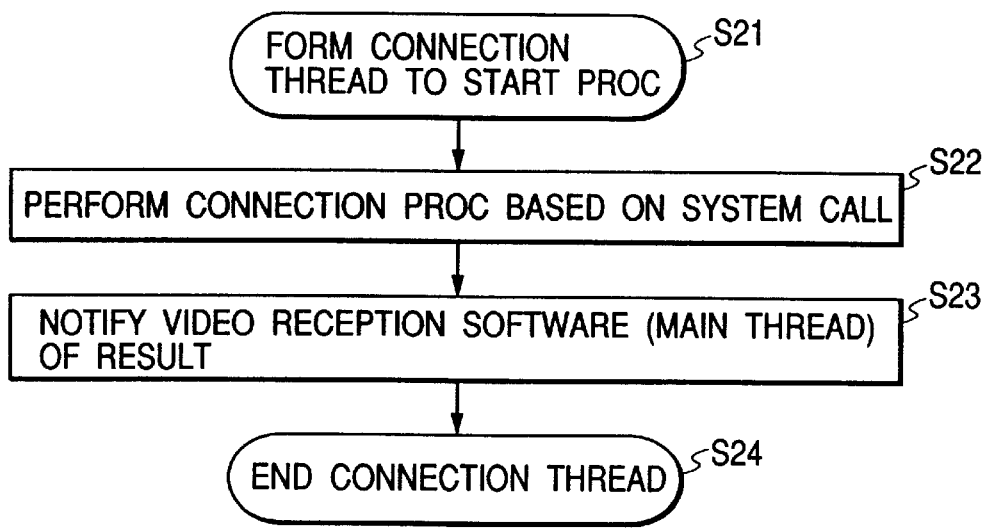
FIG. 12 is a flow chart showing a connecting process of video reception software (connection thread) in the certain monitor as the embodiment of the present invention.

FIGS. 11 and 12 are flow charts showing the connection process. The following connection process starts, when the user drags and drops the desired video camera icon and thus the connection process by the video transmitter 20 is performed through the network 100.

In FIG. 11, if the user drags and drops the icon, the video reception software 412 starts to connect with the video transmission software 422 in the video transmitter 20 to which the video camera indicated by the camera icon is connected (S11 and S12). That is, the video reception software 412 forms a connection thread performing actual connection (S13). The connection thread is formed from a main thread performing actual process of the video reception software 412, and the connection thread and the main thread operate in parallel. After the connection thread is formed, it is judged whether or not notification is transmitted from the connection thread (S14). If judged that any notification is transmitted from the connection thread, then it is judged whether or not such the notification indicates connection success (S15). If judged that the transmitted notification indicates the connection success, then it is considered that the connection succeeded (S16). On the other hand, if judged that the transmitted notification indicates connection failure, then it is considered that the connection failed, and the process continues (S19). If the notification is not transmited from the connection thread for a certain time (S17), the connection thread ends (S18), and it is considered that the connection failed, whereby the process continues (S19).

In FIG. 12, the connection thread is formed based on the main thread of the video reception software 412 (S21), and the formed connection thread operates instead of the main thread (S22). In some cases, the connection thread continues to wait for a response from the connected device. However, even in this case, the connection thread does not influence the operation of the main thread. If the waiting ends, the connection thread notifies the main thread of the waiting result (S23), and the process ends (S24). If a certain time elapses in the waiting state, the main thread forcedly ends the connection thread.

If the connection failed, the video reception software 412 notifies the camera control client software 411 and the map management software 413 of such failure. If the notification is performed, the software 411 disconnects the camera server software 421, and the software 413 returns the displaying of the camera icon to the initial state.

Subsequently, the operation that the video information is actually transmitted from the video transmitter 20 and then displayed on the monitor 60 will be explained with reference to FIGS. 13 and 14.

Figure 13:
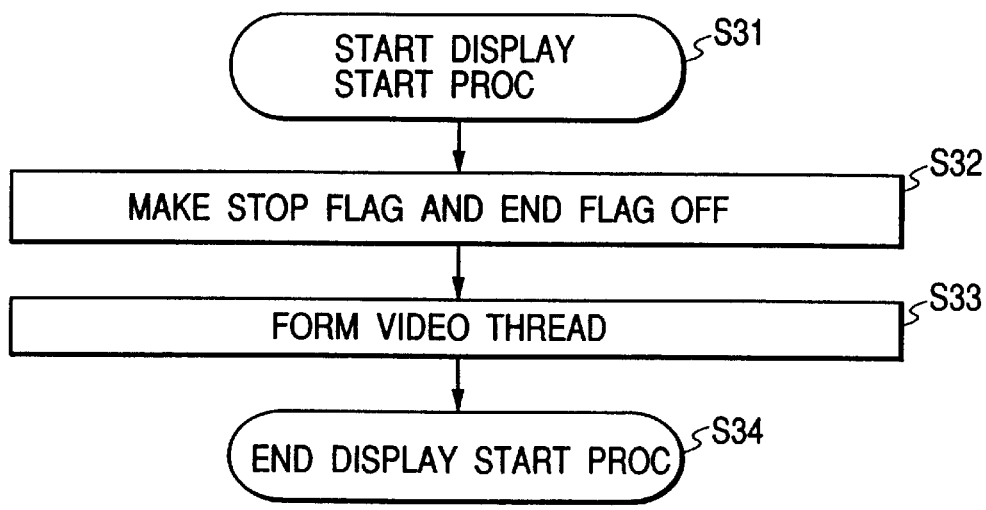
FIG. 13 is a flow chart showing a display process of the video reception software (main thread) in the certain monitor as the embodiment of the present invention.
Figure 14:
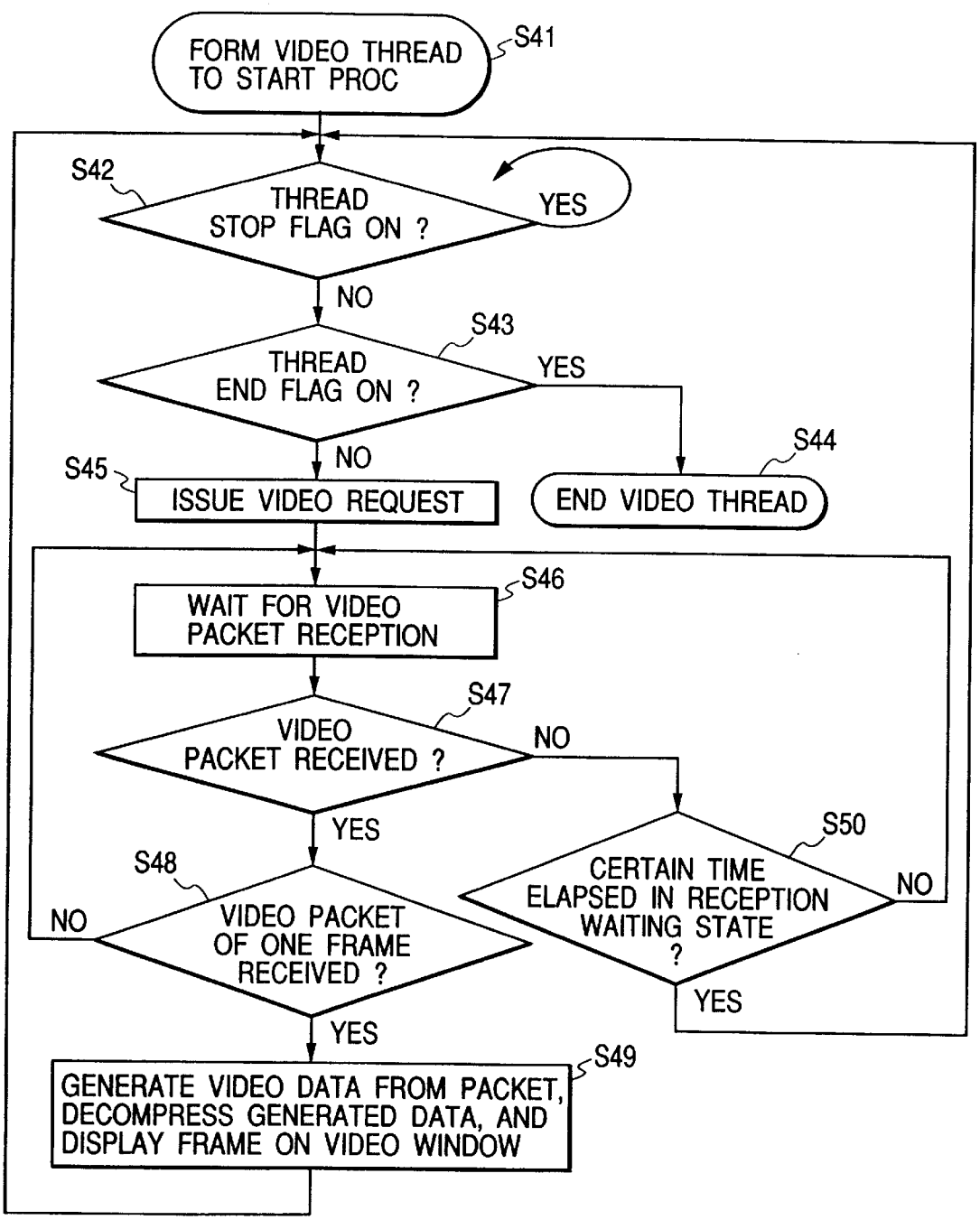
FIG. 14 is a flow chart showing a display process of video reception software (video thread) in the certain monitor as the embodiment of the present invention.

FIGS. 13 and 14 are flow charts showing the video display process. Initially, if the video reception software 412 and the video transmission software 422 succeed in connection, the display process starts (S31).

In FIG. 13, if the connection succeeds, the main thread of the video reception software 412 turns off stop and end flags for video thread controlling (S32), and then forms a video thread (S33).

In the video thread, video request issue, video information reception, video information decoding and video display are repeated. If the stop flag is turned on, the above repeating operation once stops. Then if the end flag is turned on, the video thread ends.

If the video thread formation succeeds, the video reception software 412 continues to wait for an instruction from the user interface (S34).

In FIG. 14, the formed video thread judges whether or not the stop flag is on (S42). If judged that the stop flag is on, then the process repeats the judgment. On the other hand, if judged that the stop flag is off, then it is judged whether or not the end flag is on (S43). If judged that the end flag is on, the video thread ends (S44). On the other hand, if judged that the end flag is off, the video thread transmits the video request to the video transmission software 422 (S45) and then waits for the video information of one frame sent from the software 422 in the form of plural packets (S46). If the packets can not be received for a certain time (S47, S50), the flow returns to the step S42. On the other hand, if the packets of one frame can be received (S48), one video frame is composed from the packets and then displayed on the video display area (S49). After one video frame is displayed, the flow returns to the step S42. After then, by repeating the video request issue, the video information reception, the video information decoding and the video display at high speed, the video frame at the remote location is displayed on the monitor 60 through the network 100.

In case of simultaneously displaying the video frames of the plural video cameras 10, the video thread is formed for each video camera by the video reception software 412, and the respective video threads operate in parallel. Even if a certain video thread in the plural video threads for controlling video communication to the plural video transmitters is on standby, it does not influence other video threads.

If the video frame displayed as shown in FIG. 8 is dragged and dropped into the desired video display area, the display position of the video frame of the video camera can be moved. FIG. 8 shows the state that the video frame of the video camera 523 is moved from the video display area 614 to the video display area 612. At this time, the video reception software 412 clears the corresponding video display area and changes internal parameters to set the drag and drop destination to correspond to the video display area of the video camera 10. Thereafter, the video frame of the video camera 10 is displayed on the drag and drop destination. It should be noted that the logical network connection is not disconnected even if the above operation is performed. That is, the communication network once connected is not disconnected until the video display area on which the video frame of the video camera is displayed is dragged and dropped into the trash box icon 632.

Figure 15:
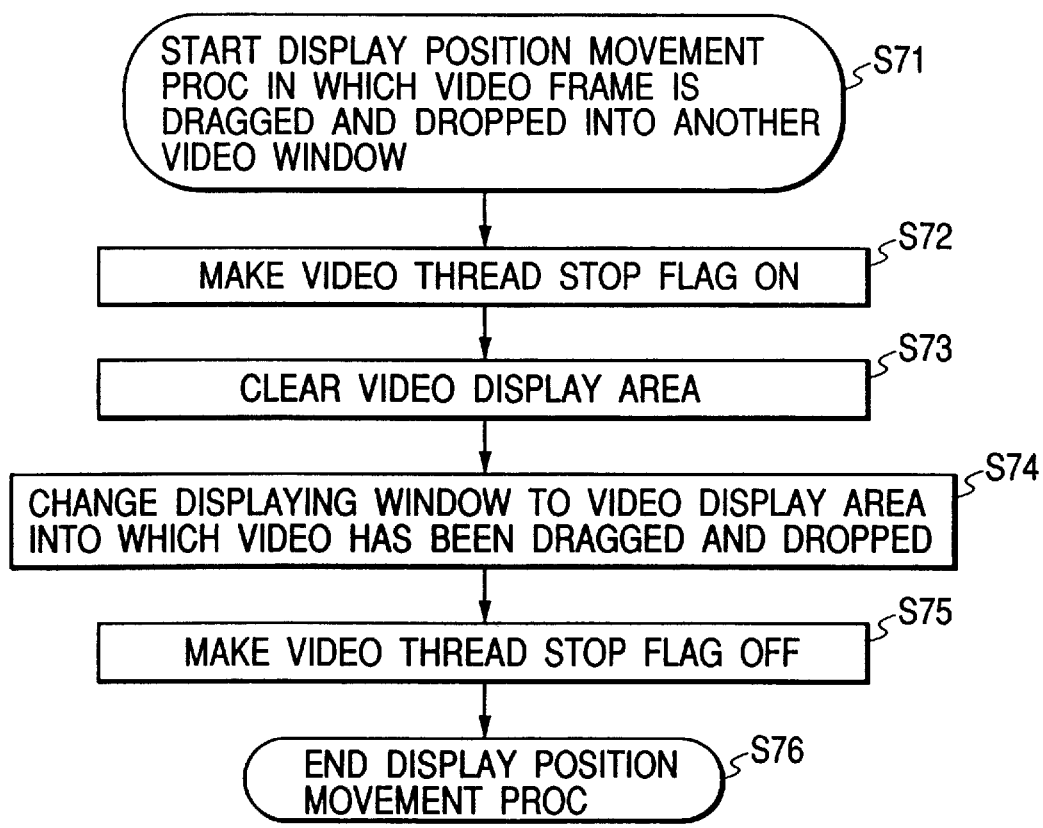
FIG. 15 is a flow chart showing a display position movement process of the video reception software (main thread) in the certain monitor as the embodiment of the present invention.

The process procedures of the video reception software 412 and the video thread at this time are shown in FIG. 15. Initially, if the video frame is dragged and dropped into another video display area (S71), the video reception software 412 turns on the stop flag of the video thread displaying the video frame, whereby the video thread stops (S72, S42). Then the video display area currently displaying the video frame is cleared (S73), and the video display area for the display is changed to the drag and drop destination (S74), and the video thread stop flag is turned off (S75). Thus, the video thread restarts and repeats the process shown in FIG. 14.

In case of stopping displaying the video frame of the video camera, the video display area on which the intended video frame of the camera 10 is dragged and dropped into the trash box icon 632 in the video display window, whereby it is possible to stop displaying the video frame. FIG. 10 shows the state after the display of the video frame of the video camera 523 on the video display area 614 is stopped.

Figure 16:
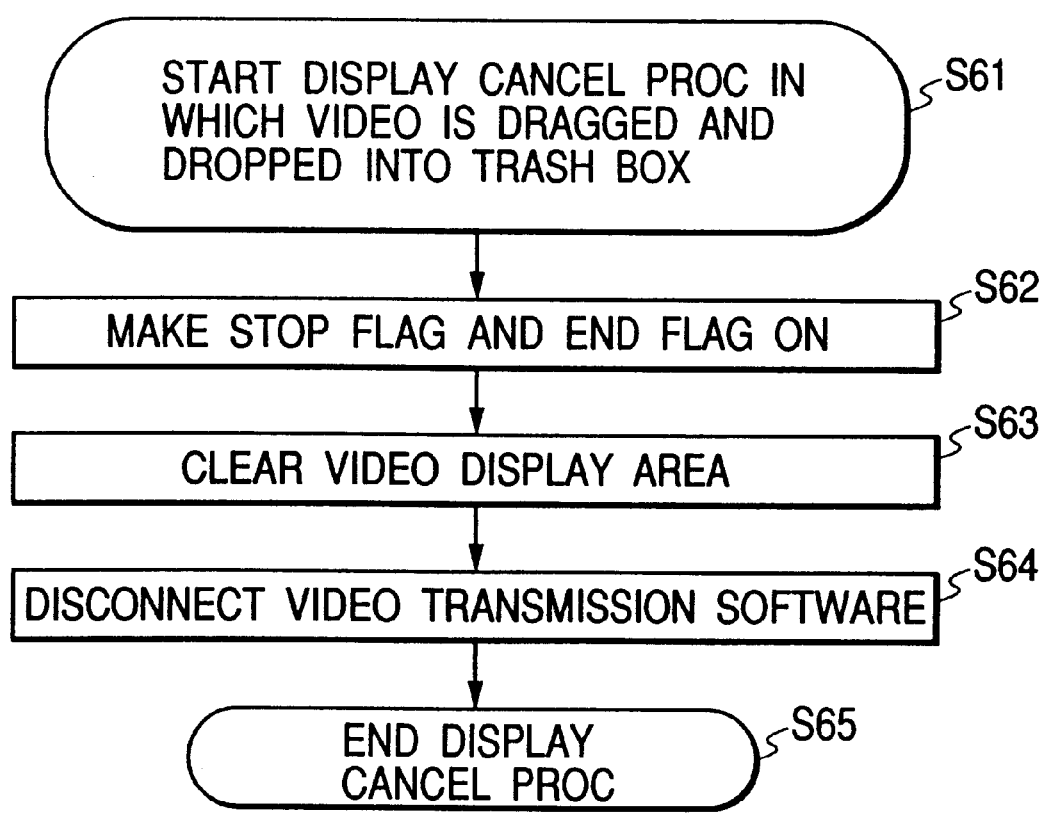
FIG. 16 is a flow chart showing a disconnect process of the video reception software (main thread) in the certain monitor as the embodiment of the present invention.

The process procedures of the video reception software 412 and the video thread at this time are shown in FIG. 16. Initially, if the video frame is dragged and dropped into the trash box icon 632 (S61), then the video reception software 412 turns on the video thread stop flag and the end flag to end the video thread (S62, S44). Subsequently, the software 412 clears the video display area currently displaying the video frame (S63), and disconnects the video transmission software 422 (S64).

Since there is no waiting time in the disconnection process, it is unnecessary to form any thread in this process. However, if such a platform as a waiting time is necessary is applied, it is possible to form a disconnection thread.

Subsequently, the video reception software 412 notifies the camera control client software 411 and the map management software 413 of the disconnection. If the software receives the display stop notification, it disconnects the network connection to the camera control server 421. Further, the software 413 eliminates the scope display from the camera icon 523 to update the map.

According to the above-described system, the connection thread performs the waiting instead of the main thread when the connection is performed, and the video thread is generated for each video transmitter to transmission request, receive, compose and display the video frame. Then the connection thread and the main thread operate in parallel.

By the above operations, in the case where the video frames of the plural information transmitters are simultaneously displayed, even if one video thread stops, other video threads perform the processes, whereby the respective video threads can perform decoding display asynchronously. As a result, it is possible to eliminate the conventional problem that performance (i.e., process speed) of the entire system is suppressed due to network speed or a trouble (i.e., exceptive process) of the information transmitter.

Further, such the system as follows can be structured by providing the thread for each of the plural information transmitters. That is, in the communication between the plural information transmitters and the monitor, it is assumed that a data transmission quantity in the unit time is large for one communication line and that data transmission quantities in the unit time are small for other communication lines. In this case, the displaying of the received image on the monitor is controlled to correspond to the data transmission quantity from the transmitter which performs the communication through the line of which data transmission quantity is small. For this reason, it is probable that the data reception from other information transmitters are weighted, and frame rate of the entire system is lowered. On the other hand, if the thread is provided for each of the information transmitters and thus the parallel processes are performed, the video frame received from each information transmitter is displayed at high frame rate as much as possible for each transmitter.

Further, even if the data is received through the communication line of which band is different for each of the plural information transmitter, it is possible by applying a multi-thread system to make variable process speed and video update speed of the received video information in accordance with the kind of line. Thus, it is possible to effectively display the video frames for all the images received from any transmitter.

Further, it is possible by the packet reception to sequentially and asynchronously display the video frame from the composited one frame.

Needless to say, the object of the present invention can be achieved also in a case where a storage medium recording therein program codes of software for realizing the functions of the above embodiment is supplied to a system or an apparatus, and thus a computer (including CPU or MPU) of the system or the apparatus reads and executes the program codes stored in the storage medium.

In this case, the program codes themselves read from the storage medium realize the functions of the above embodiment, whereby the storage medium storing therein the program codes constitutes the present invention.

As the storage medium for storing the program codes, for example, a floppy disk, a hard disk, an optical disk, a magnetooptical disk, a CD-ROM, a CD-R, a magnetic tape, a nonvolatile memory card, a ROM and the like can be used.

Further, needless to say, the present invention includes not only a case where the computer executes the read program codes to realize the functions of the above embodiment, but also a case where an OS (operating system) running on the computer performs a part or all of the actual processes on the basis of the instructions of the program codes and thus the functions of the above embodiment are realized by such the processes.

Further, needless to say, the present invention also includes a case where, after the program codes read from the storage medium are written into a memory provided in a function expansion board inserted in the computer or a function expansion unit connected to the computer, a CPU or the like provided in the function expansion board or the function expansion unit performs a part or all of the actual processes on the basis of the instructions of the program codes and thus the functions of the above embodiment are realized by such the processes.

In such the system as described above, if the video frames of the plural information transmitters are simultaneously displayed, it is possible to improve the conventional inconvenience that the performance of the entire system is suppressed due to the network speed, badness of the network and the information transmitter.

What is claimed is:

1. A video communication system in which plural information transmitters for transmitting video information are connected to an information display unit for displaying the video information received from the plural information transmitters through a network, said system comprising:

reception means for asynchronously receiving the video information from the plural information transmitters via the network, each of the plural information transmitters locating multiple points;

process means for asynchronously processing the video information received by said reception means; and display means for asynchronously displaying the video information processed by said process means.

2. A system according to claim 1, wherein the video information is compressed, and said process means performs at least a decoding process.

3. A system according to claim 1, wherein the video information is data of an image of one frame diffused in plural packets, and said process means performs a process of combining the data diffused in the plural packets into the image of one frame.

4. A system according to claim 3, wherein said display means asynchronously displays the video information, for which the process is executed, sequentially for each video information item when a communication is started.

5. A system according to claim 1, wherein the plural information transmitters communicate with the information display unit through communication lines of different bands, and said reception means receives the video information through the communication lines.

6. A system according to claim 5, wherein said process means varies a process speed of the video information received from the plural information transmitters in accordance with a kind of the communication lines.

7. A system according to claim 5, wherein said display means varies a renewal speed of video information for each of a plurality of images in accordance with a kind of the communication lines.

8. A system according to claim 1, wherein, in a case where a waiting time or an exceptive process is generated in a process for the video information from a first subset of the plural information transmitters, there occurs no influence in a process for a second subset of the plural information transmitters not including the first subset of the plural information transmitters.

9. A video communication processing method of a video communication system in which plural information transmitters for transmitting video information are connected to an information display unit for displaying the video information received from the plural information transmitters through a network, said method comprising:

a reception step of asynchronously receiving the video information from the plural information transmitters via the network, each of the plural information transmitters locating multiple points;

a process step of asynchronously processing the received video information; and a display step of asynchronously displaying the processed video information.

10. A method according to claim 9, wherein the video information is compressed, and said process step includes at least a decoding process.

11. A method according to claim 9, wherein the video information is data of an image of one frame diffused in plural packets, and said process step includes combining the data diffused in the plural packets into the image of one frame.

12. A method according to claim 11, wherein said display step includes asynchronously displaying the video information, for which the process is executed, sequentially for each video information item when a communication is started.

13. A method according to claim 9, wherein the plural information transmitters communicate with the information display unit through communication lines of different bands, and the video information is received in said reception step through the communication lines.

14. A method according to claim 13, wherein said process step includes varying a process speed of the video information received from the plural information transmitters in accordance with a kind of the communication lines.

15. A method according to claim 13, wherein said display step includes varying a renewal speed of video information for each of a plurality of images in accordance with a kind of the communication lines.

16. A method according to claim 9, wherein, in a case where a waiting time or an exceptive process is generated in a process for the video information from a first subset of the plural information transmitters, there occurs no influence in a process for a second subset of the plural information transmitters not including the first subset of the plural information transmitters.

17. A storage medium storing a computer-readable program for implementing a video communication processing method of a video communication system in which plural information transmitters for transmitting video information are connected to an information display unit for displaying the video information received from the plural information transmitters through a network, the program comprising:

code for a reception step of asynchronously receiving the video information from the plural information transmitters via the network, each of the plural information transmitters locating multiple points;

code for a process step of asynchronously processing the received video information; and code for a display step of asynchronously displaying the processed video information.

18. A storage medium according to claim 17, wherein the video information is compressed, and the process step includes at least a decoding process.

19. A storage medium according to claim 17, wherein the video information is data of an image of one frame diffused in plural packets, and the process step includes combining the data diffused in the plural packets into the image of one frame.

20. A storage medium according to claim 19, wherein the display step includes asynchronously displaying the video information, for which the process is executed, sequentially for each video information item when a communication is started.

21. A storage medium according to claim 17, wherein the plural information transmitters communicate with the information display unit through communication lines of different bands, and the video information is received in the reception step through the communication lines.

22. A storage medium according to claim 21, wherein the process step includes varying a process speed of the video information received from the plural information transmitters in accordance with a kind of the communication lines.

23. A storage medium according to claim 20, wherein the display step includes varying a renewal speed of video information for each of a plurality of images in accordance with a kind of the communication lines.

24. A storage medium according to claim 17, wherein, in a case where a waiting time or an exceptive process is generated in a process for the video information from a first subset of the plural information transmitters, there occurs no influence in a process for a second subset of the plural information transmitters not include the first subset of the plural information transmitters.

* * * * *

UNITED STATES PATENT AND TRADEMARK OFFICE
CERTIFICATE OF CORRECTION

PATENT NO.     : 6,483,878 B1
DATED          : November 19, 2002
INVENTOR(S)    : Hiroki Yonezawa et al.

It is certified that error appears in the above-identified patent and that said Letters Patent is hereby corrected as shown below:

<u>Column 1,</u>
Line 23, "own" should read -- one's own --.

<u>Column 3,</u>
Line 19, "acts" should read -- acting --; and
Line 33, "communicate" should read -- communicate with --.

<u>Column 4,</u>
Line 13, "an entire" should read -- the entirety --; and
Line 41, "an" should read -- a --.

<u>Column 5,</u>
Line 28, "held." should read -- installed. --; and
Line 65, "has" should read -- which has --.

<u>Column 6,</u>
Line 29, "an" should read -- a --.

<u>Column 9,</u>
Line 36, "the" should be deleted; and
Line 57, "transmitter," should read -- transmitters, --.

<u>Column 10,</u>
Lines 19 and 30, "such the" should read -- such --;
Line 29, "the" should be deleted; and
Line 32, "improve" should read -- eliminate --.

UNITED STATES PATENT AND TRADEMARK OFFICE
CERTIFICATE OF CORRECTION

PATENT NO. : 6,483,878 B1
DATED : November 19, 2002
INVENTOR(S) : Hiroki Yonezawa et al.

It is certified that error appears in the above-identified patent and that said Letters Patent is hereby corrected as shown below:

<u>Column 12,</u>
Line 47, "claim 20," should read -- claim 21, --; and
Line 56, "include" should read -- including --.

Signed and Sealed this

Second Day of December, 2003

JAMES E. ROGAN
*Director of the United States Patent and Trademark Office*